US007181127B2

(12) United States Patent
Nagasaka et al.

(10) Patent No.: US 7,181,127 B2
(45) Date of Patent: *Feb. 20, 2007

(54) IMAGE RETRIEVING METHOD AND APPARATUSES THEREFOR

(75) Inventors: Akio Nagasaka, Kokubunji (JP); Takafumi Miyatake, Hachiouji (JP)

(73) Assignee: Hitachi, Ltd., Tokyo (JP)

( * ) Notice: Subject to any disclaimer, the term of this patent is extended or adjusted under 35 U.S.C. 154(b) by 1304 days.

This patent is subject to a terminal disclaimer.

(21) Appl. No.: 09/956,060

(22) Filed: Sep. 20, 2001

(65) Prior Publication Data

US 2002/0012521 A1 Jan. 31, 2002

Related U.S. Application Data

(63) Continuation of application No. 09/075,521, filed on May 11, 1998.

(30) Foreign Application Priority Data

May 16, 1997 (JP) ................................. 9-126704

(51) Int. Cl.
H04N 5/781 (2006.01)
(52) U.S. Cl. .................. 386/69; 386/125; 348/552; 707/4
(58) Field of Classification Search ............. 386/69, 386/125; 348/552; 707/4
See application file for complete search history.

(56) References Cited

U.S. PATENT DOCUMENTS 5,870,754 A * 2/1999 Dimitrova et al. ....... 707/104.1

(Continued)

FOREIGN PATENT DOCUMENTS

EP 636994 A1 2/1995

(Continued)

OTHER PUBLICATIONS

H. Zhang et al, "An Integrated System for Content-Based Video Retrieval and Browsing", 1997 Pattern Recognition Society, vol. 30, No. 4, pp. 643-658, 1997.

(Continued)

Primary Examiner—James J. Groody
Assistant Examiner—James A. Fletcher
(74) Attorney, Agent, or Firm—Mattingly, Stanger, Malur & Brundidge, P.C.

(57) ABSTRACT

By sequentially inputting images for each frame, sequentially extracting features from the inputted frame images, converting the features sequentially extracted into a feature series corresponding to the inputted frame image series, compressing the feature series in the direction of the time axis, storing the compressed feature series in the storage, sequentially extracting features separately from the images to be retrieved for each inputted frame, sequentially comparing the features of the images to be retrieved for each frame with the stored compressed feature series, storing the progress state of this comparison, updating the stored progress state of the comparison on the basis of a comparison result with the frame features of the succeeding images to be retrieved, and retrieving image scenes matching with the updated progress state from the images to be retrieved on the basis of the comparison result between the updated progress state and the features of the images to be retrieved for each frame, the present invention can retrieve video images on the air or video images in the data base at high speed and enables self organization of video to be classified and arranged on the basis of the identity of partial images of video.

10 Claims, 17 Drawing Sheets

U.S. PATENT DOCUMENTS

| | | | |
|---|---|---|---|
| 6,122,628 | A | 9/2000 | Castelli et al. |
| 6,134,541 | A | 10/2000 | Castelli et al. |
| 6,181,867 | B1 | 1/2001 | Kenner et al. |
| 6,222,532 | B1 | 4/2001 | Ceccarelli |
| 6,285,788 | B1 | 9/2001 | Sezan et al. |
| 6,587,637 | B2 * | 7/2003 | Nagasaka et al. .............. 386/69 |
| 2001/0014891 | A1 | 8/2001 | Hoffert et al. |

FOREIGN PATENT DOCUMENTS

| | | |
|---|---|---|
| JP | 7-46517 | 2/1995 |
| JP | 7-114567 | 5/1995 |
| JP | 8-227462 | 9/1996 |
| JP | 9-65287 | 3/1997 |
| JP | 09065287 | 3/1997 |
| WO | 97/10564 | 3/1997 |

OTHER PUBLICATIONS

A. Nagasaka et al, "Realtime Video Scene Detection based on Shot Sequence Encoding", The IEICE (Institute of Electronics, Information and Communication Engineers), Transaction D-II, vol. J79-D-II, No. 4,, pp. 531-537, (Apr. 1996).

N. Dimitrova et al, "Content-Based Video Retrieval by Example Video Clip", SPIE, vol. 3022, Feb. 13, 1997, pp. 59-70.

* cited by examiner

TARGET IMAGE: X X' | A' A' B" B' C' C" | Y
            (1)(2) (3)(4)(5)(6)(7)(8) (9)

THE QUERIED IMAGE: A A | A A B B C C | D
            ① ② ③ ④ ⑤ ⑥ ⑦ ⑧ ⑨

| FRAME | CANDIDATE FRAME | | | | | | | | | | | | | | NUMBER OF CANDIDATES |
|---|---|---|---|---|---|---|---|---|---|---|---|---|---|---|---|
| (1) | | | | | | | | | | | | | | | 0 |
| (2) | | | | | | | | | | | | | | | 0 |
| (3) | ① | ② | ③ | ④ | | | | | | | | | | | 4 |
| (4) | ↓ | ↓ | ↓ | × | ① | ② | ③ | ④ | | | | | | | 7 |
| (5) | × | × | ↓ | | × | × | × | ↓ | ⑤ | ⑥ | | | | | 4 |
| (6) | | | ↓ | | | | | ↓ | ↓ | × | ⑤ | ⑥ | | | 5 |
| (7) | | | ↓ | | | | | ↓ | ↓ | | × | ↓ | ⑦ | ⑧ | 5 |
| (8) | | | ↓ | | | | | ↓ | ↓ | | ↓ | ↓ | × | ⑦ | ⑧ | 6 |
| (9) | | | × | | | | | × | × | | × | × | | × | × | 0 |

TARGET IMAGE

THE QUERIED IMAGE (PLURAL)

FEATURE TABLE STRUCTURE

| SEGMENT NO. | FEATURE | FRAME NO. |
|---|---|---|
| 1 | A | $t_1$ |
| 2 | B | $t_i$ |
| 3 | C | $t_j$ |
| 4 | D | $t_k$ |
| ⋮ | ⋮ | ⋮ |

302 — SEGMENT NO.
300
304

FIG. 12

CANDIDATE LIST STRUCTURE

| |
|---|
| POINTER TO THE CANDIDATE 1 STRUCTURE |
| POINTER TO THE CANDIDATE 2 STRUCTURE |
| POINTER TO THE CANDIDATE 3 STRUCTURE |
| ⋮ |

400
402

CANDIDATE STRUCTURE

FIG. 14

RETRIEVED RESULT TABLE

| POINTER 1 TO THE RETRIEVAL SEGMENT STRUCTURE | SEGMENT LENGTH 1 |
|---|---|
| POINTER 2 TO THE RETRIEVAL SEGMENT STRUCTURE | SEGMENT LENGTH 2 |
| POINTER 3 TO THE RETRIEVAL SEGMENT STRUCTURE | SEGMENT LENGTH 3 |
| ⋮ | ⋮ |
| ⋮ | ⋮ |

602, 600, 604

RETRIEVAL SEGMENT STRUCTURE

| TOP FRAME NO. OF THE RETRIEVAL SEGMENT |
|---|
| POINTER TO THE NEXT RETRIEVAL SEGMENT STRUCTURE |

700, 702, 704

IMAGE RETRIEVING METHOD AND APPARATUSES THEREFOR

This application is a continuation application of U.S. Ser. No. 09/075,521, filed May 11, 1998.

BACKGROUND OF THE INVENTION

1. Field of the Invention

The present invention relates to a retrieving method and apparatuses therefor for video images on the air or video images in a data base or others and more particularly to a video image retrieving method and apparatuses therefor for performing high-speed retrieval by the help of features of video images.

2. Description of the Prior Art

Recently, multi-media information processing systems can store and indicate various types of information such as video and text to users. However, with respect to retrieval of them, a retrieving method using a language such as a keyword is mainly used. In this case, a keyword assigning operation is necessary and it is extremely expensive to assign a keyword to each frame of video having a large amount of information. Furthermore, since a keyword is freely assigned by a data base constructor, there is a problem imposed that when the viewpoint of a user is different from that of the data base constructor, the keyword will be useless. In these circumstances, a request for retrieval from a unique image feature in addition to the keyword is made. However, to retrieve information on the basis of the feature of an image, a high-speed comparison art between the video feature comprising enormous frames and the feature for the queried image is necessary. As a high-speed comparison art only applicable to video images, "Video retrieving method and apparatuses therefor" is proposed in Japanese Patent Application Laid-Open 7-114567. This method does not compare all the frames but compares only an image at the time of changing of cut of images so as to reduce the processing amount. By doing this, the high speed also suited to comparison of images on the air is realized. On the other hand, there is a problem imposed that a scene comprising only one cut or a scene in which the cut change timing varies with editing before or after cannot be compared satisfactorily. Furthermore, during retrieval, scenes other than the scene specified as a retrieval key are not searched in the same way as with other general data base systems, so that whenever scene retrieval becomes necessary, it is necessary to repeatedly compare a very large amount of video information from the beginning thereof to the last. The scene comparison process includes a number of processes such as processes to be performed commonly even if the scene to be retrieved is different as well as the feature extraction and reading processes and repetitive execution of such a process is of no use.

SUMMARY OF THE INVENTION

An object of the present invention is to solve the aforementioned problems and to provide an image retrieving method for comparing the feature of a target image to be retrieved and the feature of a sample image to be prepared for query at high speed without performing a keyword assigning operation for image retrieval and for detecting the same segment with the frame accuracy. A target image on the air or in the data base is applicable.

Another object of the present invention is to provide a method for detecting the same scene existing in the target image regardless of whether it is specified as a retrieval key beforehand in the same way at the same time with input of the target image.

Still another object of the present invention is to provide a video camera for comparing, when recording an image series inputted from moment to moment during picking up of images, those images with recorded images and recording them in association with matched images.

To accomplish the above objects, the present invention is a signal series retrieving method and apparatuses therefor in an information processing system comprising a time sequential signal input means, a time sequential signal process controller, and a storage, wherein the method and apparatuses sequentially input time sequential signals, sequentially extract features in each predetermined period of the inputted time sequential signals, convert the features sequentially extracted into a feature series corresponding to the inputted predetermined period series, compress the feature series in the direction of the time axis, store the compressed feature series in the storage, sequentially extract features from the time sequential signals to be retrieved in each predetermined period of the inputted time sequential signals, sequentially compare the features of the time sequential signals to be retrieved in each predetermined period with the stored compressed feature series, store the progress state of with the progress state from the time sequential signals to be retrieved on the basis of the comparison result between the stored progress state of the comparison and the features of the time sequential signals to be retrieved in each predetermined period.

More concretely, the present invention divides a video image to be compared into the segment-wise so that the feature of each frame is set in the variation width within the specific range respectively, extracts one or a plurality of features in each segment, stores it or them in correspondence with the address information indicating the position in the image in the segment, then sequentially inputs frame images one by one from video images to be retrieved, and when the feature series at an optional point of time in which the features of the frame images are sequentially arranged and the feature series in which the features in the segments constituting the stored images are sequentially arranged in each segment length have portions equal to or more than the specific length which can be decided to be mutually equivalent to each other, detects the portions as a same image. In this case, when they are equivalent to each other from the top of a segment, the present invention obtains the address information corresponding to the segment and when they are decided to be equivalent to each other from halfway of a segment, the present invention obtains the relative position from the top of the segment, and outputs a corrected value of the address information corresponding to the segment as a retrieval result. Furthermore, the present invention collects a frame image series inputted as a retrieval target in each segment so that the features of the frames are set in the variation width within the specific range, extracts one or a plurality of features in each segment, also stores the information corresponding to the address information indicating the position in the target image in the segment, and adds it to the target images to be compared next. Furthermore, with respect to the inputted feature series, when there are a plurality of video portions which are detected to be the same, the present invention groups them, associates them to each other, and stores them.

An apparatus realizing the aforementioned retrieving method comprises a means for dividing an optional image into the segment-wise so that the feature of each frame is set in the variation width within the specific range respectively, a means for extracting one or a plurality of features in each segment, a means for storing it or them in correspondence with the address information indicating the position in the image in the segment, a means for sequentially inputting frame images one by one from images to be retrieved, a means for retaining the feature series at an optional point of time in which the features of the frame images are sequentially arranged, a means for generating the feature series in which the features in the segments constituting the stored images are sequentially arranged in each segment length, and a means for deciding whether the feature series have portions equal to or more than the specific length which can be decided to be mutually equivalent to each other. The present invention also has a means for obtaining, when they are decided to be equivalent to each other from the top of a segment, the address information corresponding to the segment, when they are decided to be equivalent to each other from halfway of a segment, obtaining the relative position from the top of the segment, and outputting a corrected value of the address information corresponding to the segment as a retrieval result. Furthermore, the present invention has a means for collecting a frame image series inputted as a retrieval target in each segment so that the features of the frames are set in the variation width within the specific range, a means for extracting one or a plurality of features in each segment, and a means for also storing the information corresponding to the address information indicating the position in the target image in the segment and adding it to the target images to be compared next. Furthermore, with respect to the inputted feature series, when there are a plurality of scenes which are detected to be the same, the present invention has a means for grouping them, associating them to each other, and storing them.

The foregoing and other objects, advantages, manner of operation and novel features of the present invention will be understood from the following detailed description when read in connection with the accompanying drawings.

BRIEF DESCRIPTION OF THE DRAWINGS

FIG. 11 is a drawing showing the feature table structure used in an embodiment of the present invention.

FIG. 12 is a drawing showing the candidate list structure used in an embodiment of the present invention.

FIG. 14 is a drawing showing the retrieval result table and retrieval segment structure used in an embodiment of the present invention.

DETAILED DESCRIPTION OF THE PREFERRED EMBODIMENTS

Figure 1:
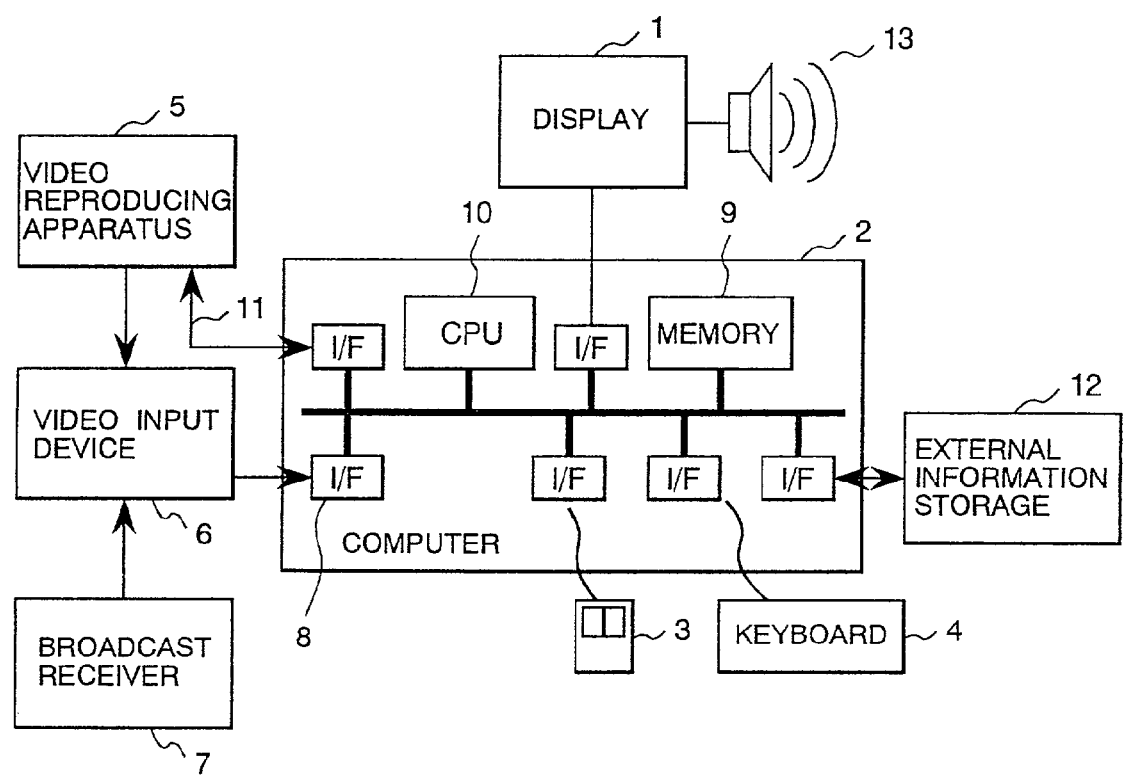
FIG. 1 is a block diagram of a system for executing an embodiment of the present invention.

An embodiment of the present invention will be explained hereunder by referring to the drawings.

FIG. 1 is an example of a schematic block diagram of the system configuration for realizing the present invention.

Numeral 1 indicates a display such as a CRT, which displays an output screen of a computer 2. When the output of the computer is voice, the computer 2 outputs it via a speaker 13. An instruction to the computer 2 can be issued using a pointing device 3 and a keyboard 4. A video reproducing apparatus 5 is an optical disk or a video deck. A video signal outputted from the video reproducing apparatus 5 is sequentially converted to digital image data by a video input device 6 and sent to the computer. In certain circumstances, an image on the air can be fetched and a video signal from a broadcast receiver 7 is inputted to the video input device 6. When a video server recording an image as digital data or digital video is used instead of the video reproducing apparatus 5, the video input device 6 is unnecessary or a function for expanding compressed and recorded image data and converting it to incompressed image data is controlled. If the broadcast is of a digital system, the same may be said with the broadcast receiver 7. Inside the computer, digital image data is inputted to a memory 9 via an interface 8 and processed by a CPU 10 according to a program stored in the memory 9. When video handled by the CPU 10 is sent from the video reproducing apparatus 5, a number (frame No.) is sequentially assigned to each frame image starting from the top of video. When a frame number is sent to the video reproducing apparatus by a control line 11, the apparatus can control so as to reproduce the video of the scene. When video is sent from the broadcast receiver 7, no frame number is assigned, so that the apparatus records a sequence number or time starting from a process start time of 0 as required and uses it instead of the frame number. Various informations can be stored in an external information storage 12 as required by the internal process of the computer. Various data created by the process which will be explained hereunder is stored in the memory 9 and referred to as required.

Figure 2:
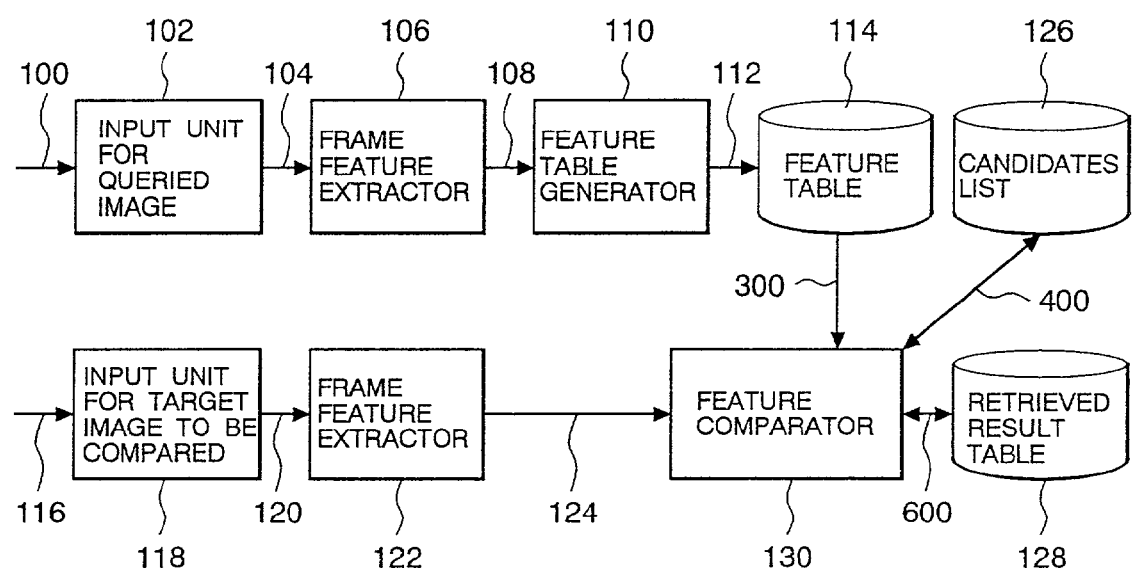
FIG. 2 is a block diagram of a process for executing an embodiment of the present invention.

FIG. 2 is a whole block diagram showing the process outline of the image retrieval process of the present invention. This process is executed inside the computer 2. The process program is stored in the memory 9 and executed by the CPU 10. Hereunder, the process will be explained on the assumption that each unit is described as a software procedure to be executed by the CPU 10. However, needless to say, a function equivalent to this procedure can be realized by hardware. In the following explanation, the processes performed by the software are blocked for convenience. Therefore, for example, in FIG. 2, the input unit for queried image indicates an input process for queried image. In this embodiment, an image of the scene to be found out (hereinafter, called a queried image) 100 is sequentially inputted for each frame by an input unit for queried image 102 beforehand prior to retrieval and temporarily stored in the memory 9. A frame feature extractor 106 extracts a feature 8 from a frame image 104 in the memory 9. A feature table generator 110 pairs up the feature and the top frame number for each segment of a string of features when the feature is within the allowable variation range, creates a feature table 112, and records it in a storage 114. Also an image 116 to be retrieved is sequentially inputted for each frame by an input unit for target image to be compared 118 in the same way as with a queried image and temporarily stored in the memory 9. A frame feature extractor 122 extracts a feature 124 from a frame image 120 in the memory 9. In this case, the frame feature extractor 122 performs the exactly same process as that of the frame feature extractor 106. A feature comparator 130 compares the newest time sequential array of the features 124 sequentially sent from the frame feature extractor 122 with a stored feature table 300 (the data content is the same as that of the feature table 112) for consistency. The progress state of the comparison is stored in the storage 126 in the form of a candidates list 400 which will be described later and updated every input of a new frame. If the features are consistent with each other, the image segment corresponding to the feature table is outputted to a storage 128 or the other processor as a retrieved result table 600 which will be described later. If any name and attribute are associated with the retrieved image in this case, it is naturally possible to output the name and attribute.

Next, the process performed by each unit mentioned above will be explained more in detail.

Figure 3:
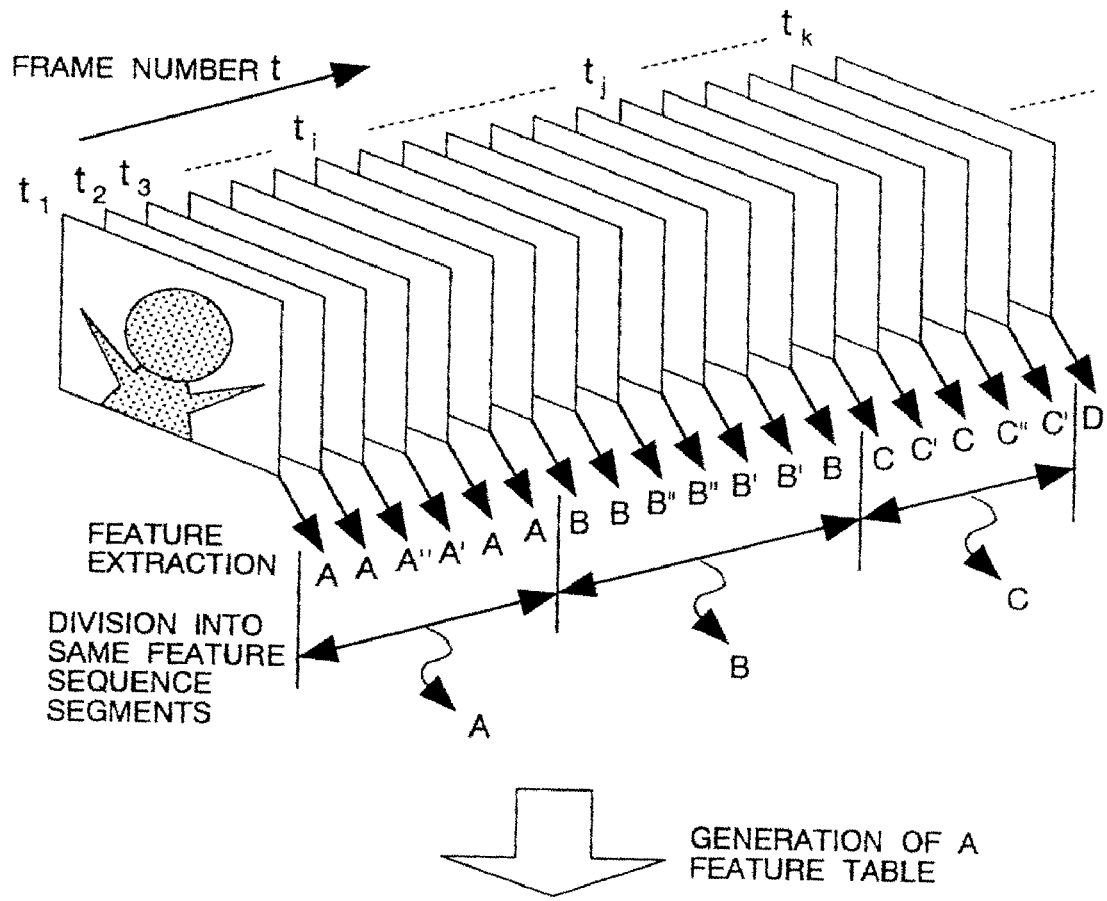
FIG. 3 is a schematic view showing the feature extracting method of an embodiment of the present invention.

FIG. 3 shows a series of flow (100 to 114) from input of a queried image to creation of a feature table. The object of this process is to compress queried images to a minimum quantity of information which can represent the features thereof so as to store more types of queried images and compare them in real time at one time. Concretely, features are extracted from frame images sequentially inputted first. In this case, the feature is explained as information which can be represented by several bytes such as the mean color of the whole frame images. As a feature, in addition to it, patterns generally known such as the shape of the boundary line and texture of a specific image can be widely applied. Furthermore, the time sequential array of obtained features is collected for each segment within the allowable variation range and one feature is represented in each segment. A' or A" shown in the drawing indicates that assuming A as a standard, the absolute value of the difference of the feature value of A' or A" from that of A is less than a specific threshold value. To each frame of inputted images, frame numbers are sequentially assigned such as $t_1$, $t_2$, $t_3$, —, and the frame numbers $t_i$, $t_j$, $t_k$, — of the top frame of each segment and the features A, B, C, — are paired up, and a list is generated as a feature table. In this case, video comprises 30 frame images per second, so that although depending on the kind of an image to be searched for, assuming that the mean segment length is 10 frames, a permutation pattern comprising 10 or more features can be obtained even from a scene in only several seconds. Furthermore, if the length of each segment is added to the restrictions, the number of permutations and combinations of feature tables becomes extremely large in this case and a performance for sufficiently specifying one scene even in many images can be expected.

Figure 4:
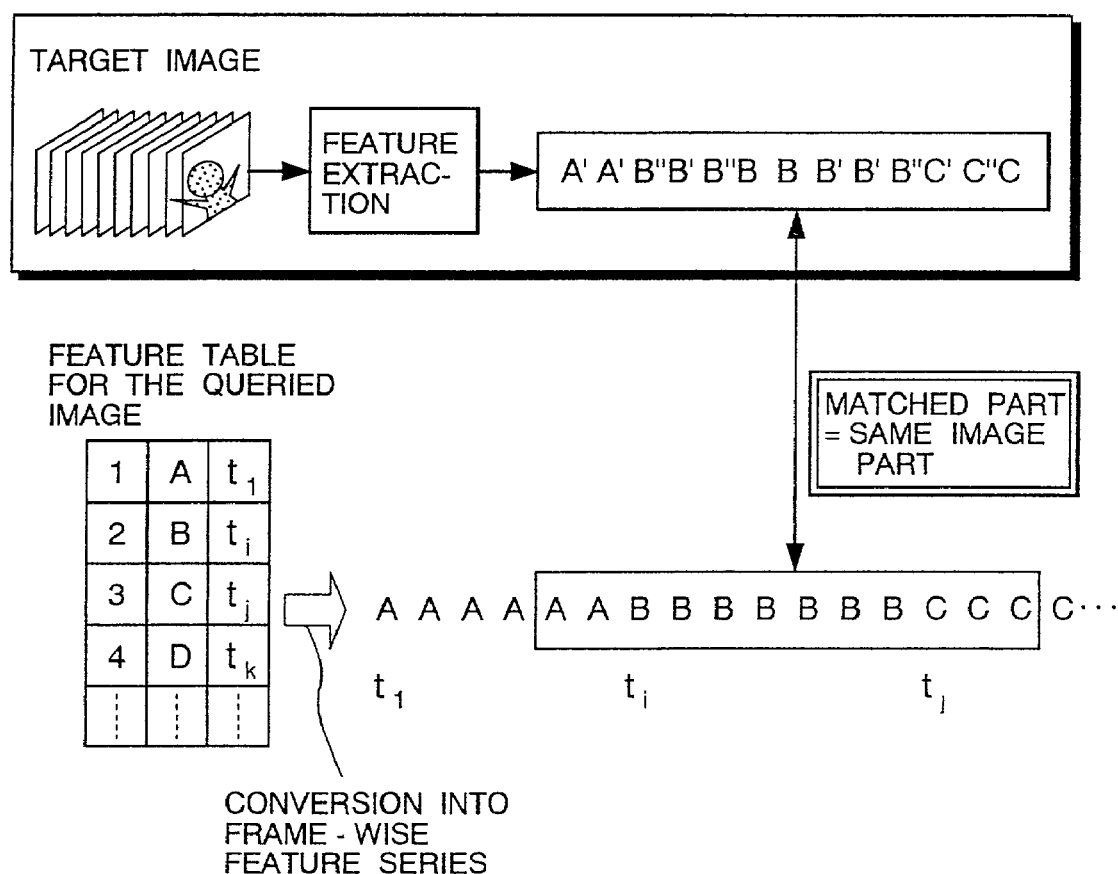
FIG. 4 is a schematic view showing the feature comparing method of an embodiment of the present invention.

FIG. 4 schematically shows the situation of comparison (the feature comparison process 130) between the video image to be retrieved and the queried image stored beforehand. As mentioned above, with respect to target images to be retrieved, frame image are sequentially inputted and features are extracted (116 to 124). On the other hand, with the queried images compressed in the form of feature table, the features are arranged in the length of each segment and the feature series is returned from the run-wise to the frame-wide during comparison (130). In the case of comparison, a queried image having a feature series matching with the feature series in a length more than the specific threshold value which has the newest frame just inputted from the target image as a last end is returned as a retrieved result. In this case, not only a complete match but also a partial match of the feature series are detected and when the length of the matched part is more than the threshold value, it is also returned as a retrieved result. By doing this, also a scene in which the length is delicately different due to editing can be correctly retrieved.

Figure 5:
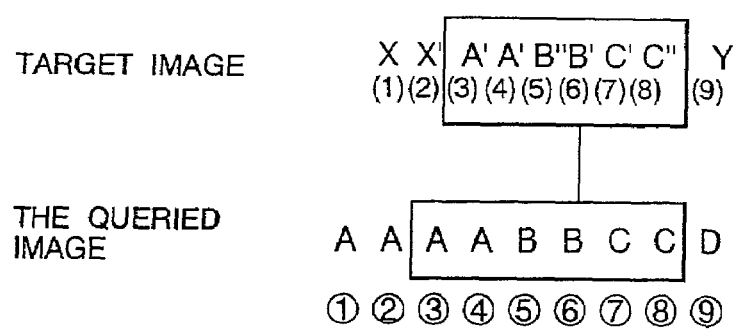
FIG. 5 is a drawing showing an example of feature comparison flow of an embodiment of the present invention.
Figure 6:
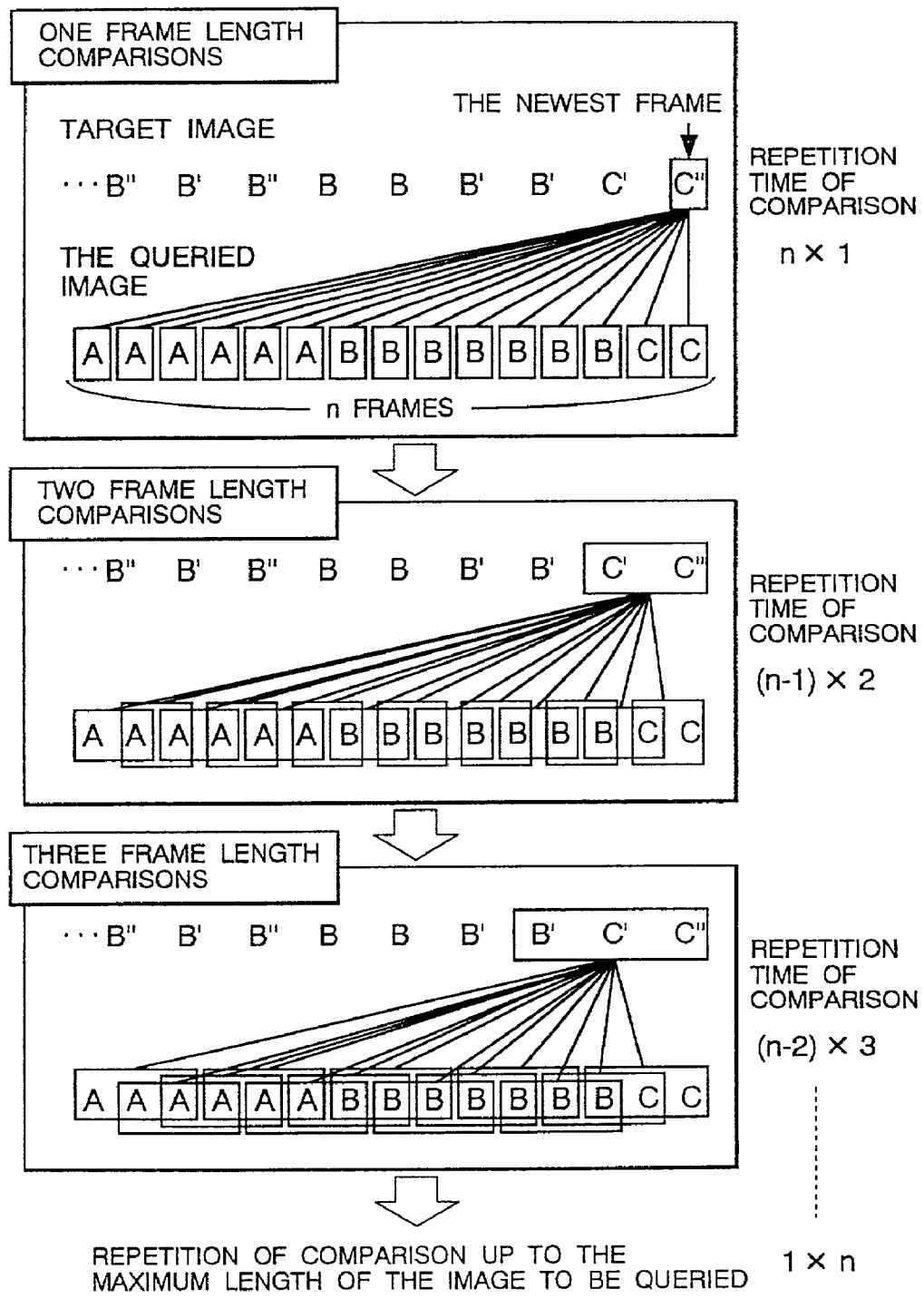
FIG. 6 is a schematic view showing an example of the conventional comparing method.

FIG. 5 shows the comparison process of the present invention more in detail. If, when a feature series in an indefinite length as mentioned above is compared, the comparison is simply executed, it is necessary to repeat a comparison on the assumption of various frame lengths as shown in FIG. 6 whenever a frame image is newly inputted from the target image. The number of inter-frame comparisons in this case is extremely enormous as shown in the drawing and the comparison process is not suited especially to comparison in real time such that new frames are inputted one after another at a rate of once per 1/30 seconds. The reason is that the comparison process is executed quite independently of the previous comparison process every input of a frame and even if a match of a certain degree of length is ascertained by the just prior process, the information cannot be applied to the next comparison process. Therefore, the present invention takes an approach to reduce the comparison process to be performed for one frame input and to stepwise perform the comparison process so as to supplement the previous process every frame input. Concretely, the comparison is executed as indicated below.

(1) When a frame is inputted from the target image, it is searched whether there is a feature which is the same as that of the frame in the queried image and all found frames are temporarily stored as candidates.

(2) When the next frame is inputted from the target image, it is checked whether the feature of the frame matches with the feature of the frame immediately after the frame stored as a candidate immediately before.

(3) When they match with each other, the frame is set as a candidate together with the frame stored as a candidate immediately before and when they do not match with each other, the frame is excluded from a candidate and a frame having the same feature as that of the just inputted frame is newly added as a candidate. In this case, if the frame excluded from a candidate is kept consistent for the length (the number of frames) more than the specific threshold value till that time, the matched segment with the frame set at the top is outputted as a retrieved result.

(4) The aforementioned operations are repeated.

The comparison principle of the present invention will be concretely explained hereunder by referring to the example shown in FIG. 5.

Firstly, a new frame is inputted from the target image and the frame (1) in which the feature X is obtained will be considered. Since there is not the feature X in the queried image, nothing is performed. The same may be said with the frame (2). When the frame (3) is inputted and the feature A' is obtained, there is the feature A matching with A' in the queried image, so that all the frames 1 to ④ having the feature A in the queried image are set as candidates. Depending on the appearing condition of features of frames to be inputted hereafter from the target image, any of these candidate frames has a possibility that one segment with the frame set at the top becomes a scene to be retrieved. In the lower table shown in FIG. 5, ① to ④ written on the line of Frame (3) indicate frames in the queried image which are selected as candidates at this point of time. Also in the next frame (4), the feature A' is obtained. Firstly, all the frames selected as candidates at the preceding step are checked whether the next frames match in feature. As a result, the frames ① to ③ match in feature but the frame ④ does not match in feature because the feature of the next frame ④ is changed to B. The portion of x marked on the fourth line in the table indicates it and the frame (4) selected as a candidate in the frame (3) is excluded from a candidate at this point of time. At the same time, as candidates in the frame (4), ① to ④ which are the same as those of (3) are newly added on the fourth line in the table. Although the frames ① to ④ added on the line (3) are the same as the frames ① to ④ added on the line (4), they are handled as different candidates as comparison candidates. Furthermore, B is obtained in the frame (5) and ① and ② selected as candidates in (3) and ① to ③ selected as candidates in (4) are excluded from candidates. In the same way, ⑤ and ⑥ are selected as candidates at this point of time. When the aforementioned process is repeated whenever a frame is inputted from the target image, candidates matching continuously up to the step of the frame (8) are only ③ selected as a candidate in (3), ④ selected as a candidate in (4), ⑤ selected as a candidate in (5), ⑥ selected as a candidate in (6), and ⑦ selected as a candidate in (7). At the point of time that the frame (9) is inputted and no comparison can be made, it is found that the frames (3) to (8) of the target image and the queried images ③ to ⑧ have a longest matching segment. These results match with the comparison results when the comparison of scenes is checked by sequentially changing the length with the frame (8) as starting point using the conventional method previously shown in FIG. 6. In the case of FIG. 6, assuming the number of frames of queried images as n, the repetition time of comparison between the frames to be executed every one frame input is n(n+1)(n+2)/6 times as shown in FIG. 6 and the order of the calculated value is $0(n^3)$. However, according to this method, only the sum of (1) the repetition time c of checking for a match of the feature of a newly inputted frame with the feature of the next frame to the candidate frame and (2) the repetition time n of checking whether there is the same feature as that of the newly inputted frame in the queried images is acceptable, and generally n>>c, and the order is 0(n). This difference is cased by use of the inductive method for obtaining the result of adding the current frame on the basis of the processing result up to the just prior frame. n can be made smaller than the original number of frames by use of the aforementioned feature table and a quicker comparison can be expected. Furthermore, the retrieved result can be clearly positioned with the frame accuracy.

Figure 7:
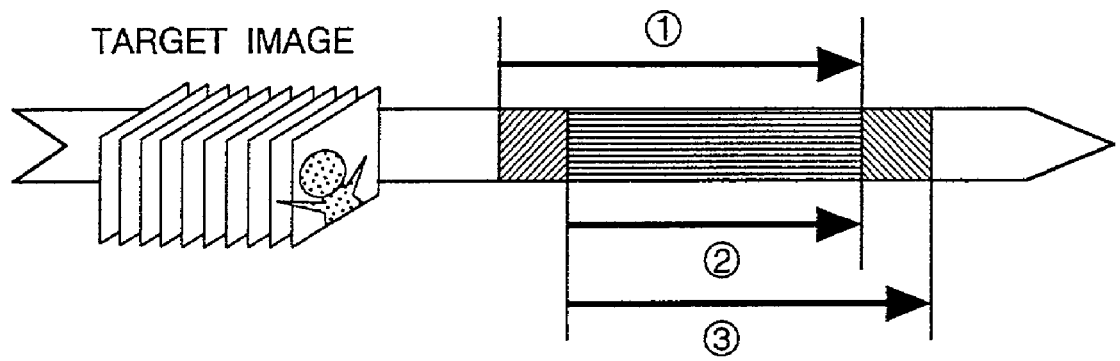
FIG. 7 is a schematic view for explaining the comparing method of an embodiment of the present invention.
Figure 7:
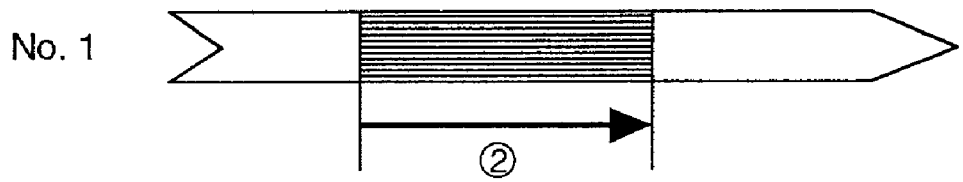
Figure 7:
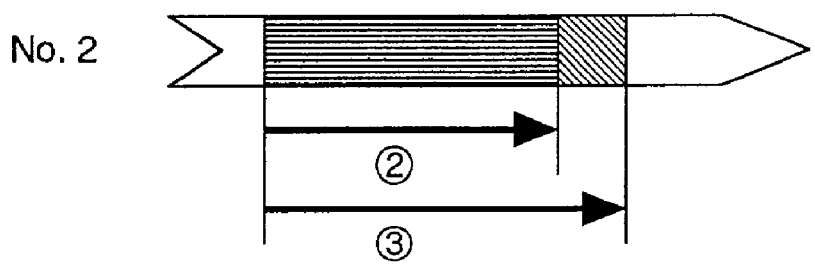
Figure 7:
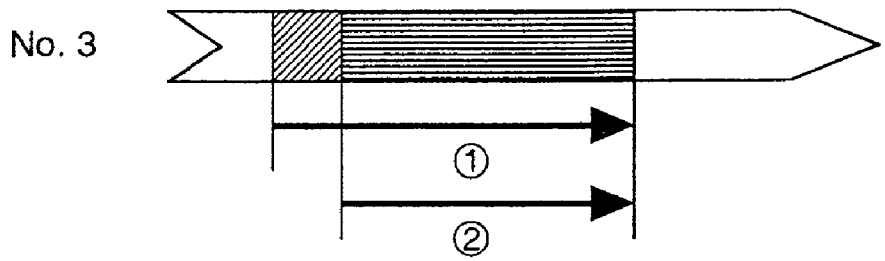

In the above explanation, a case of one queried image is assumed. However, the principle can be also applied to a plurality of queried images without trouble. For comparison every frame input, it is desirable only to repeat the aforementioned process for the number of queried images. However, as shown in FIG. 7, although the same image part is included in each of the queried images, they may be delicately different in the longitudinal direction due to an effect of a different editing way. In the drawing, three kinds of ways ①, ②, and ③ are shown. The same may be said with a case that a plurality of same image parts are included in one queried image. When only whether there is a matched part in the queried image is necessary, no problem is imposed. However, depending on the object of retrieval, also the classification may be required on the basis of the accurate position and length of the matched segment. In this case, it is necessary to clearly output what segment matches with what segment as a retrieved result. When there is an overlapped part as shown in No. 2 and No. 3 in the drawing, it is necessary to indicate the overlapped part in consideration of the inclusion relationship. The method of the present invention can process also this problem at high speed without changing the basic comparison principle. In the comparison process of this method, it is described that when a frame is inputted from the target image and the feature thereof is obtained, a group of frames having the same feature as that of the target image is selected as candidates from the queried images. In this case a group of matched segments with the frames selected as candidates at the same time set at the top which reach a length more than the detected threshold value is images which are equal to each other. In the example shown in FIG. 7, the segment ② exists in each of the three queried images and all the top frames of the segments of the queried images are selected as candidates at the same time when the frame corresponding to the top of the segment ② is inputted from the target image. Although there is the possibility that there are other frames to be selected as candidates at the same time, they are excluded from candidates before they reach a length more than the detected threshold value. They reach the end of the segment ② and when the next frame is compared, the matched segment in the queried images of No. 1 and No. 3 is excluded from a candidate. The target image still continues the match with No. 2. However, the segment ② is decided for the present and it is outputted as a retrieved result that ② is detected in the queried images No. 1 to No. 3. However, even if the segment ② ends, the queried image No. 2 continuously remains as a candidate because also the next frame is still matched with the target image and finally the segment ③ is decided. Even if there is a segment on this side of ② like ① the matched segment is detected and decided in the same way. As mentioned above, according to the method of the present invention, only by performing a brief check when a segment is selected as a candidate or excluded from a candidate, scenes of various variations delicately different in the longitudinal direction can be discriminated and detected respectively with the comparison processing amount every frame input kept small.

Figure 8:
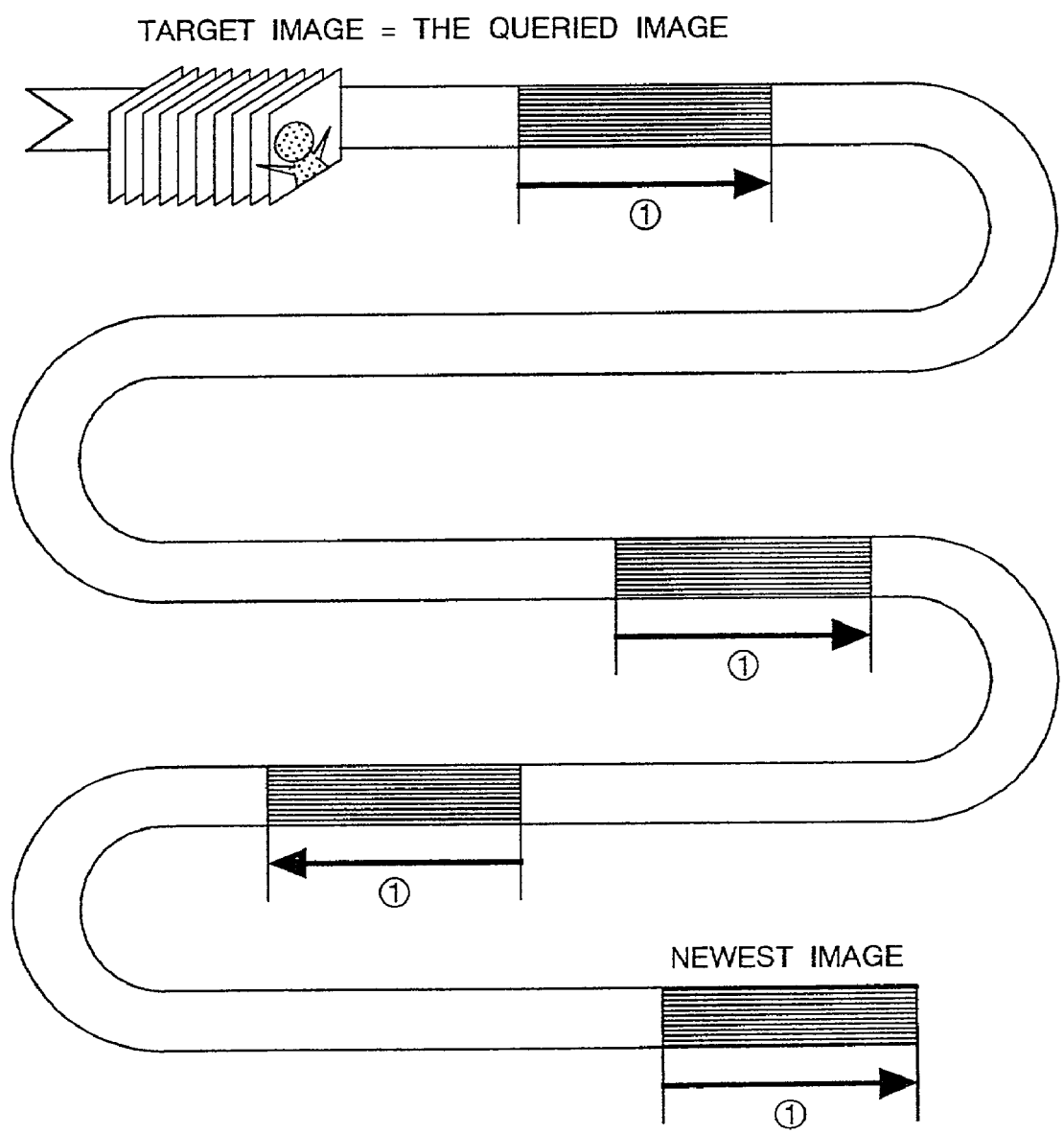
FIG. 8 is a schematic view for explaining the comparing method of an embodiment of the present invention.

In the above explanation, a case that queried images are prepared beforehand and then the target image is retrieved is used. However, this method can be applied even if the queried images are just target images. FIG. 8 shows a conceptual diagram thereof. Target images are inputted, and all of them are stored, and they are handled as if they are the aforementioned queried images. It can be realized by the block diagram shown in FIG. 9. Although it is almost similar to the block diagram shown in FIG. 2, the queried images are the same as the target images, so that the process up to extraction of frame features can be shared and the frame feature 108 is distributed for storage and comparison. By this mechanism, the part of target images inputted past where the newest image part ① inputted from the target images appears can be detected at the same time with input. If scenes appear several times past, all of them are detected at the same time on the aforementioned comparison principle, so that they are collected, classified, and arranged for each detected same scene. So to speak, self organization of video is automatically realized in real time. For example, if the present invention is applied to an apparatus for recording TV programs for several weeks to which a memory capacity for storing all TV programs for several weeks is installed, the same image is generally outputted every time at the opening of a program, so that by detecting the image and collecting the images before and after it, the programs can be arranged in real time at the same time with recording. If it is found that there are a plurality of same scenes, it is possible to leave only one image and erase the residual images by leaving only pointers, so that the use efficiency of media for recording can be improved. Although also a commercial message is one of images outputted repeatedly, to play back a recorded program, the commercial message can be automatically skipped as required. In this case, by use of the commercial characteristic that the length is just 15 seconds or 30 seconds, the decision performance as to whether it is a commercial message is improved.

Figure 9:
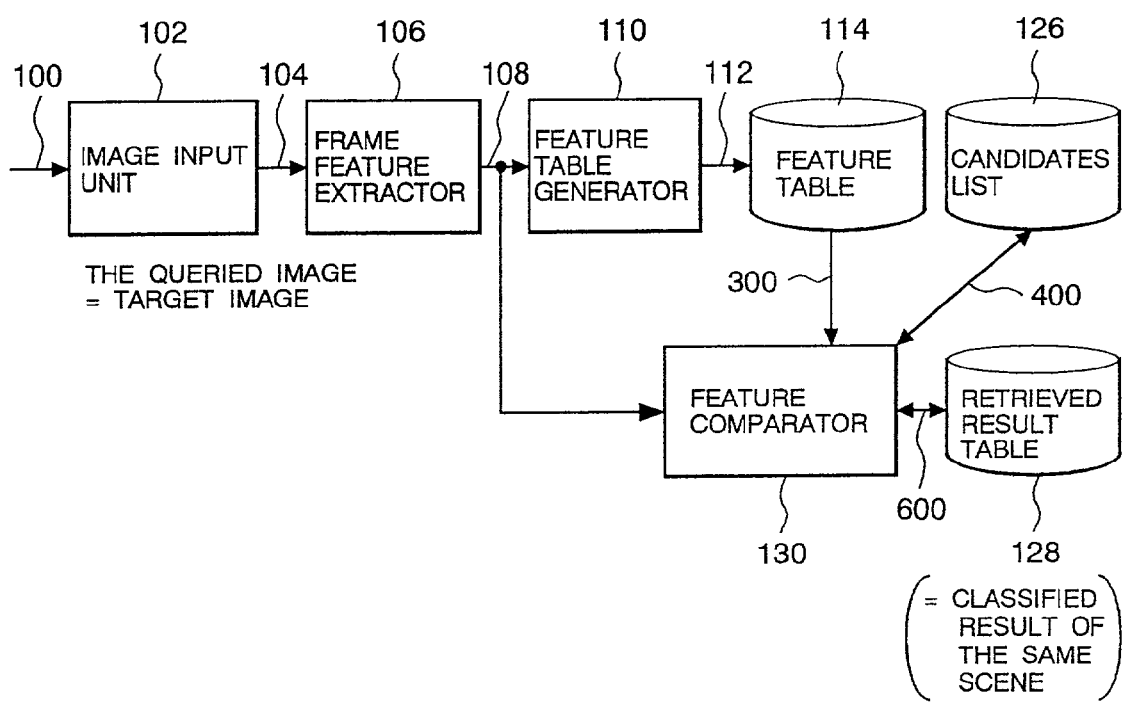
FIG. 9 is a block diagram of a process for executing an embodiment of the present invention.
Figure 10A:
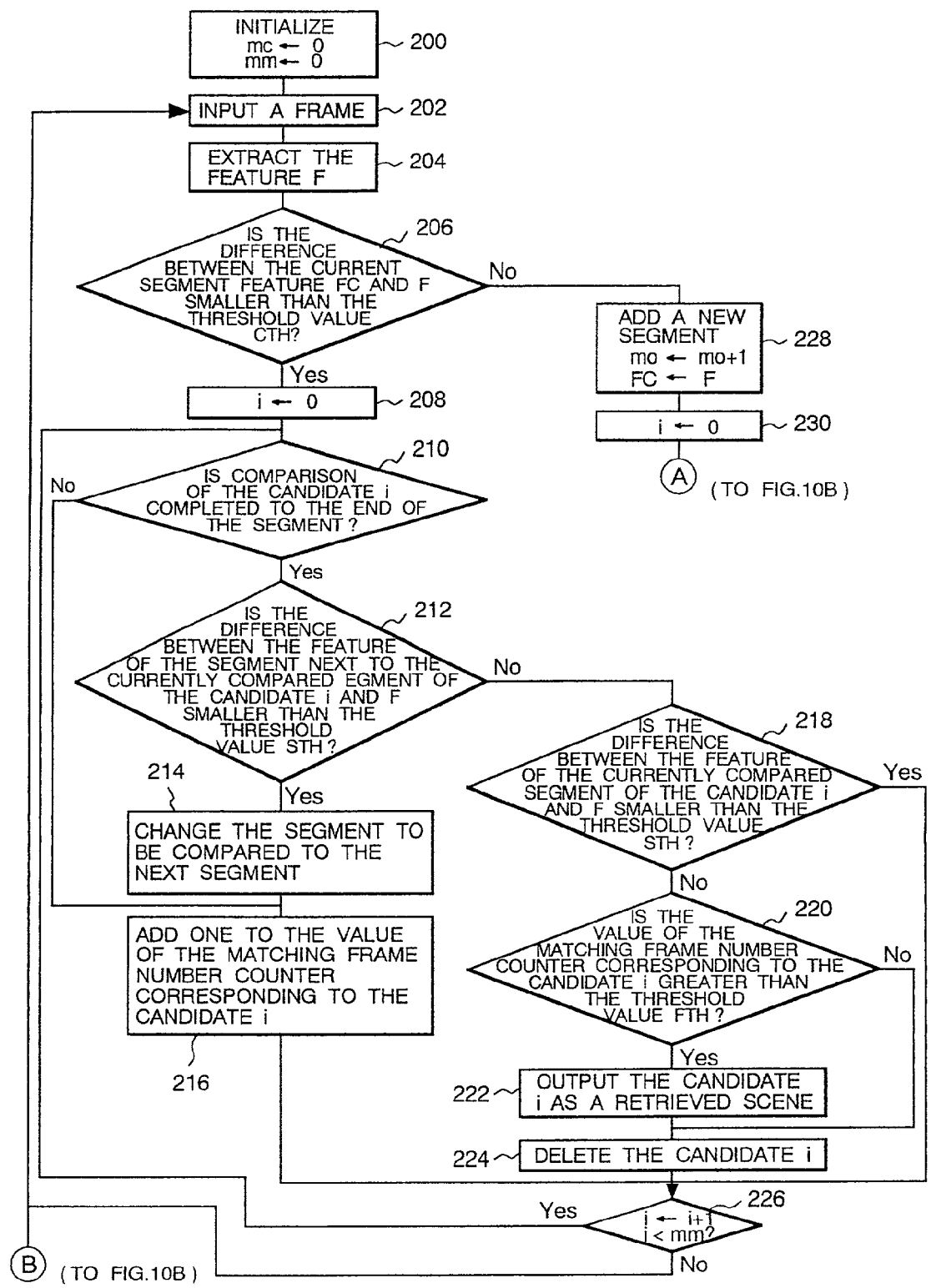
FIGS. 10A and 10B are flow charts of an embodiment of the present invention.
Figure 10B:
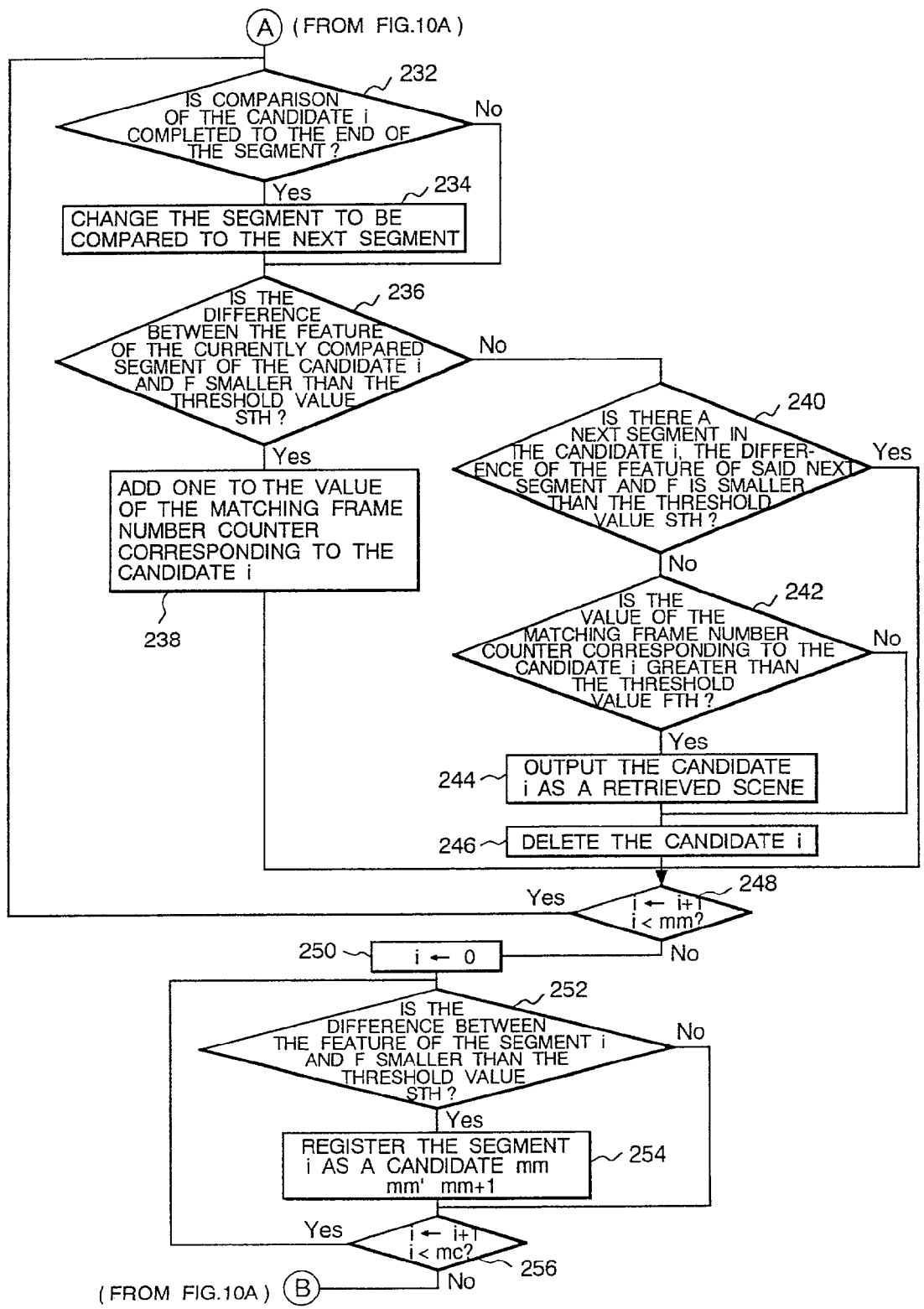

In the above explanation, the process of realizing the block diagram shown in FIG. 9 can be represented more concretely by the flow charts shown in FIGS. 10A and 10B. Also the process of realizing the block diagram shown in FIG. 2 is self-evident from FIGS. 10A and 10B. In the above explanation, for simplicity, the feature of the queried image is returned from the run-wise to the frame-wise once and then compared. However, to make the specification closer to the practical use, a method of comparison in the run-wise state will be indicated hereunder.

Figure 13:
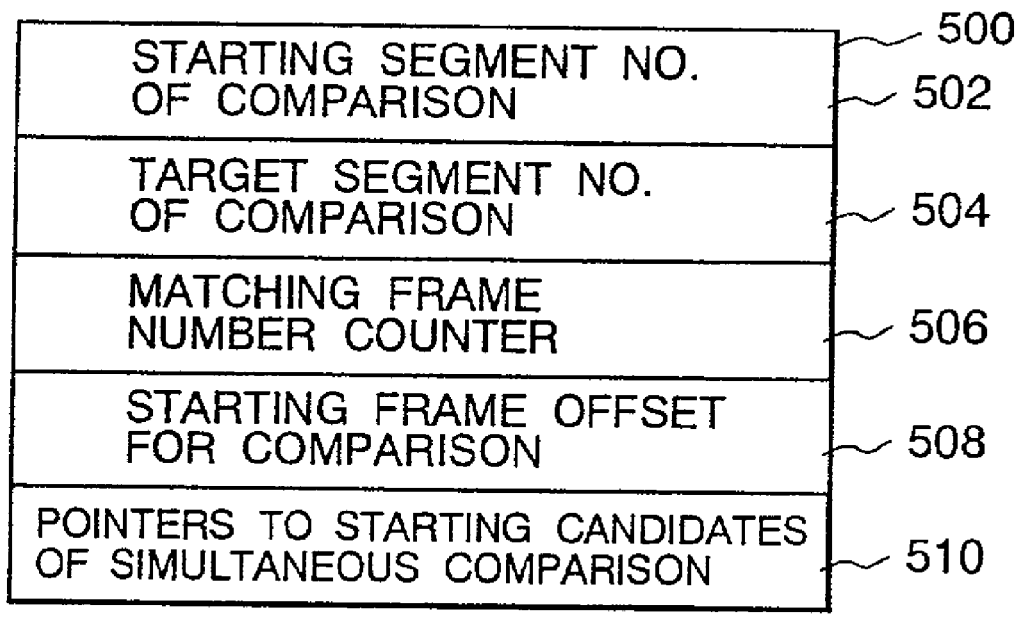
FIG. 13 is a drawing showing the candidate structure used in an embodiment of the present invention.

Firstly, at Step 200, the apparatus and various variables are initialized. The variables mc and mm are set to 0. Next, a frame image is inputted from the target image (Step 202) and the feature F is extracted from the frame image (Step 204). The feature F uses the mean of colors of all pixels existing in the frame image. The color of each pixel is represented by the three components R, G, and B, and with respect to the value of each component, the values on the whole screen are averaged respectively, and a set of three values (Ra, Ga, Ba) is obtained, and this set is assumed as the feature F. If a first frame is inputted, a feature table structure 300 shown in FIG. 11 is newly generated and F is written into 302 as a feature of the first segment (segment No. 1). In this case, the frame number is also written into 304 as a pair. The feature table generated like this will function hereafter for the already mentioned queried image. In this case, the variable mc indicating the maximum value of the segments stored in the feature table structure 300 is incremented by one and the program is returned to Step 202 as it is. On the other hand, if the second frame or a subsequent frame is inputted, Step 206 is executed. At Step 206, the feature FC of the newest segment (the segment of the segment number mc-1) stored in the feature table and the current feature F are compared and it is decided whether the difference is smaller than the threshold value CTH. In this case, although the feature is a set of three values as mentioned above, only when the differences between the three values are all smaller than the threshold value CTH, it is represented that the difference is smaller than the threshold value CTH. If the difference is smaller than the threshold value CTH, it is decided that the frame currently inputted can be collected in the same segment as that of the just prior frames and the program goes to Step 208. At Step 208, the loop counter i is reset to 0. i is incremented by 1 every time at Step 226 and Steps 210 to 224 are repeated until i becomes larger than mm. In this case, mm indicates the number of candidates at the stage of continuous inspection among all images (stored as the feature table 300) inputted until now on the assumption that there is the possibility that the part is the same as an image being newly inputted at present. A structure 500 for storing the status variable indicating the inspection stage of each of all candidates is generated and managed by a candidate list structure 400 as shown in FIG. 12. Pointers to the candidate structure 500 are stored in the candidate list structure 400 and dynamically added or deleted during execution. FIG. 13 shows the constitution of the candidate structure 500 and the segment number when it is registered as a candidate is stored as a starting segment number of comparison 502 and the segment number which starts from the segment and is a target of comparison at present is stored as a target segment number of comparison 504. A matching frame number counter 506 indicates the repetition time of matching since selected as a candidate, that is, the matching segment length. A starting frame offset for comparison 508 is a variable necessary for positioning with the frame accuracy by performing comparison in run-wise, which will be described later. Pointers to starting candidates of simultaneous comparison 510 connect a group of candidates simultaneously registered to each other in the connection list format and candidates simultaneously registered can be sequentially traced by referring to 510. At Step 210, the program checks whether the comparison of the candidate i (indicated as a means of the i-th candidate among the mm candidates) is completed to the end of the segment which is a comparison target at present. When the frame number obtained by adding the matching frame number counter 506 to the frame number of the segment indicated by the starting segment number of comparison 502 reaches the frame number of the segment next to the segment which is a comparison target at present, it is found that the comparison reaches the end. If it does not, the program increments the matching frame number counter of the candidate i by one (Step 216) and goes to Step 226. If it does, the program refers to the feature of the segment following the segment Which is a comparison target at present and checks whether the difference between the feature and F is smaller than the threshold value STH (Step 212). If the difference is smaller than the threshold value STH, the program changes the segment to be compared to the next segment and continues the comparison (Step 214). By doing this, even if the segment changing location is different from the input image, it can be stably compared. This is a necessary process because, since a video signal may be changed due to noise during image input and characteristics of the apparatus, the changing point of the segment is not always the same even if the same image is inputted. The reason for use of the threshold value STH which is different from the threshold value CTH deciding the segment change timing is that the change of an image is absorbed in the same way and a stable comparison is executed. On the other hand, at Step 212, when the difference is larger than the threshold value STH, the program checks whether the difference between the feature of the segment which is a comparison target at present and the current feature F is smaller than the threshold value STH (Step 218). If the difference is smaller than the threshold value STH, the program goes to Step 226 without doing anything. The reason is that since a segment is selected as a candidate not in frame-wise but in segment-wise and the features do not always match with each other starting from the top of the segment, while an input image having the same feature as that of the segment which is a comparison target at present is obtained, the program only waits by positioning for the present. If the difference is larger than the threshold value STH, it is regarded that the features do not match with each other any more. If the value of the matching frame number counter of the candidate i is larger than the threshold value FTH in this case (Step 220), the program outputs the candidate i as a retrieved scene (Step 222). The program deletes the candidate i from the candidate list (Step 224) and goes to Step 226.

At Step 206, if the difference is larger than the threshold value CTH, it is decided that the currently inputted frame cannot be collected in the same segment as that of the previous frames and a new segment is added to the feature table 300 (Step 228). In this case, mc is incremented by one and F is substituted for FC. At Step 230, the loop counter i is reset to 0. i is incremented by one every time at Step 248 and Steps 232 to 246 are repeated until i becomes larger than mm. Ac Seep 232, the program checks whether the comparison of the candidate i is completed to the end of the segment which is a comparison target at present. This can be obtained by the same method as that of Step 210. If the comparison reaches the end, the program changes the segment to be compared to the next segment (Step 234) and if it does not, the program does nothing. Next, the program checks whether the difference between the feature of the segment which is a comparison target at present and the newest feature F is smaller than the threshold value STH (Step 236). If the difference is smaller than the threshold value STH, the program increments the matching frame number counter of the candidate i by one (Step 238) and goes to Step 248. If the difference is larger than the threshold value STH, the program checks not only one segment immediately after the segment which is a comparison target at present but also the following segments sequentially and checks whether there is a segment having the same feature as the current feature F (Step 240). If there is, the program changes the next segment to a segment to be compared, substitutes the difference between the frame number of the segment and the frame number which is attempted to compare at first for the starting frame offset for comparison 508, and goes to Step 248. Also the frame numbers do not always match with each other starting from the top of the segment, so that the positioning with the frame accuracy can be executed by use of this offset. In this case, if the size of the offset is larger than the segment length when it is selected as a candidate, the program goes to Step 242 by the same handling as that when no matching following segment is found. If it is not, it is equivalent to the comparison started from a segment behind the segment selected as a candidate first and in this case, it is expected that in the comparison started from the rear segment, a match is smoothly continued and the processing is duplicated. If, when no matching following segment is found, the value of the matching frame number counter of the candidate i is larger than the threshold value FTH (Step 242), the program outputs the candidate i as a retrieved scene (Step 244). The program deletes the candidate i from the candidate list (Step 246) and goes to Step 248. When the process for all the candidates ends, the program searches all segments having the same feature as that of the currently inputted frame image from the segments stored in the feature table, generates a candidate structure having these segments as comparison starting segments, and adds it to the candidate list (Steps 250 to 256).

At Steps 222 and 244 among the aforementioned steps, the program not only outputs the information of a found scene as it is but also can output it in the formats shown in FIG. 14. The retrieved result table 600 collects and groups found scenes for each same scene and manages the entry of each group. A group of same scenes is obtained as previously explained in FIG. 7. Each of found scenes is represented by a retrieved segment structure 700 and the same scenes represent one group in the connection list format that the scenes have mutually pointers. Pointers to same scenes forming a connection list are stored in 704 and the top frame number of each segment is stored in 702. A pointer to the retrieval segment structure which is the top of the connection list representing a group is stored in 602 as an entry of the group. In the same group, the segment lengths of all scenes in the group are the same, so that they are paired up with the entry and stored in 604.

When the aforementioned processes are repeated, a scene which appeared once in the past is detected the moment it appears once again and the top and length of the segment are positioned with the frame accuracy. The top of the segment is a frame in which the starting frame offset for comparison of the candidate structure is added to the frame number of the segment indicated by the starting segment number of comparison of the candidate structure and the length is the value of the matching frame number counter itself. Hereafter, by collecting each same segment, automatic self organization can be realized. However, in the case of a scene that a still image continues for a long time, a problem also arises that by this method reducing the feature of each frame, the characteristic time change of the feature cannot be obtained and the probability of matching with another still image scene by mistake increases. If this occurs, needless to say, it can be solved by increasing the feature for each frame image. Also in the case of a scene that the feature changes little, even if a shift of several frames occurs, the features can match with each other. In such a case, a plurality of segments are overlapped and detected in the same range. As a typical example of it, there is a case that an image just inputted matches with a segment a little before in the same cut (one of the units constituting an image, a collected-image segment continuously photographed by a camera). The reason is that the frames in the same cut are well similar to each other on an image basis due to the redundancy of images. If this occurs, by introducing the known detection method for the cut change timing and performing a process of not regarding as a match in the same cut, the problem can be avoided.

Figure 15:
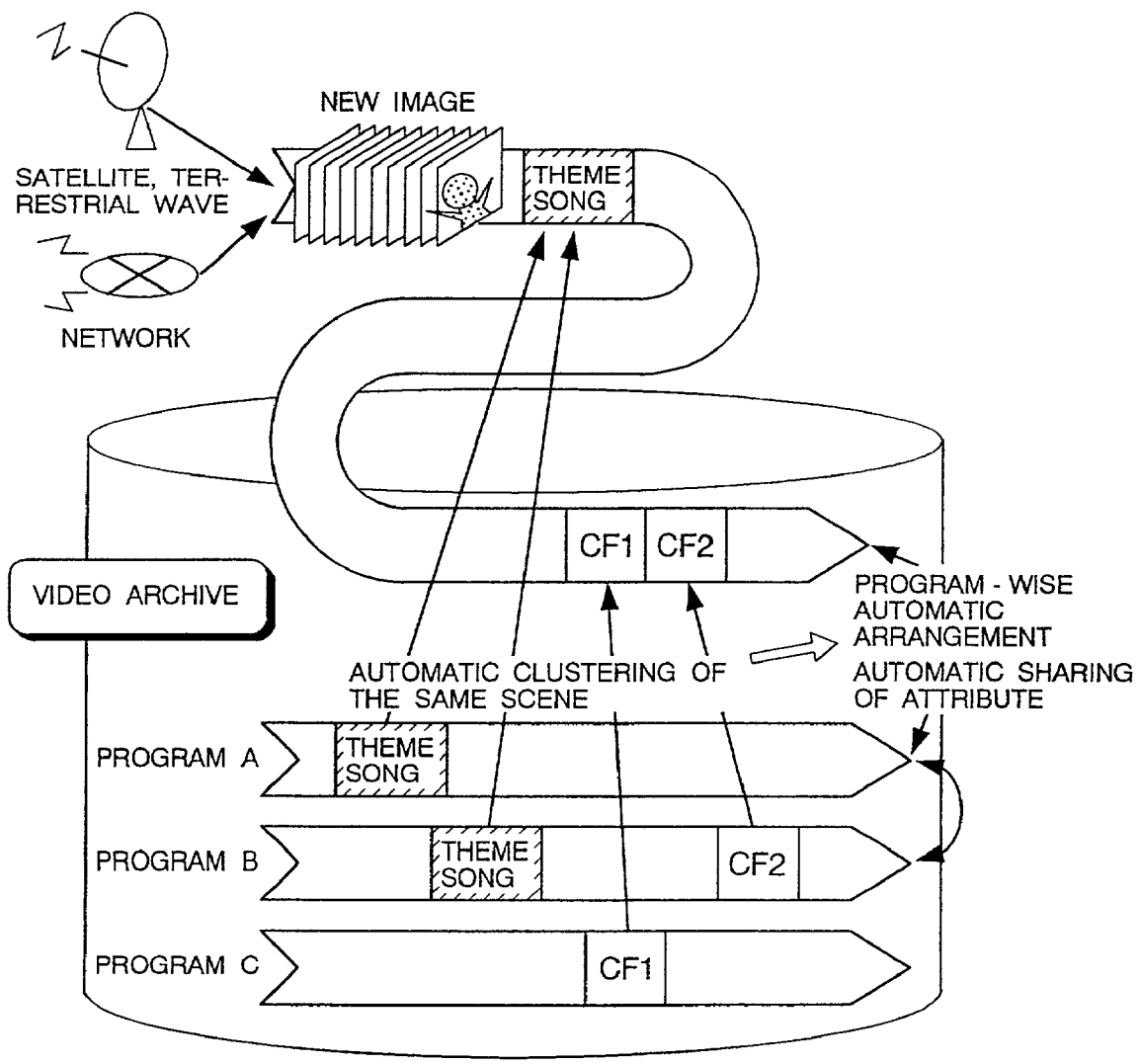
FIG. 15 is a schematic view of a video recorder system applying an embodiment of the present invention.

FIG. 15 is a conceptual diagram showing an embodiment of a next generation video recorder system using the present invention, particularly the method shown in FIG. 8. The system records video of a TV program and also executes the function of the present invention at the same time. Address information such as a frame number is assigned to each frame of video to be recorded, and the address information is used as the frame number 304 of the feature table 300 which is generated by the present invention, and a one-to-one synchronization is established between the video data and the feature table. When the recording ends, the feature table and various variables used in the present invention are stored in a nonvolatile storage so as to be read and restarted when the next recording starts. By doing this, it is possible to newly input images, compare them with the images already stored in the video archive in real time at the same time, and automatically associate the same scenes with each other. For example, if a program for comparing the inputted images and the theme song portion is already stored, they are sequential programs and can be automatically collected and arranged as a same classification. If, when sequential programs are watched for the first time, information is assigned as a common attribute of the whole sequential programs, it is possible to allow an image just inputted to immediately share the information. As mentioned previously, also a commercial message appearing repeatedly can be detected and skipped. However, only based on a commercial message existing in an image recorded and stored, only a limited number of commercial messages can be detected. Therefore, even when no images are recorded, images are checked for 24 hours, and a commercial portion is detected from a repetitive scene, and with respect to the images of the commercial portion, although the images are not recorded, only a feature table is generated and recorded. By doing this, more commercial messages can be detected with the image capacity kept unchanged and a commercial message can be skipped more securely. As mentioned above, when the present invention is mounted in the next generation video recorder system, automatic arrangement of a recorded program and automatic skipping of a commercial message can be simply executed and the usability is extremely improved. In the aforementioned embodiment, it is emphasized that broadcasting images can be set as an object. However, needless to say, even images stored in a file may be set as an object.

Figure 16:
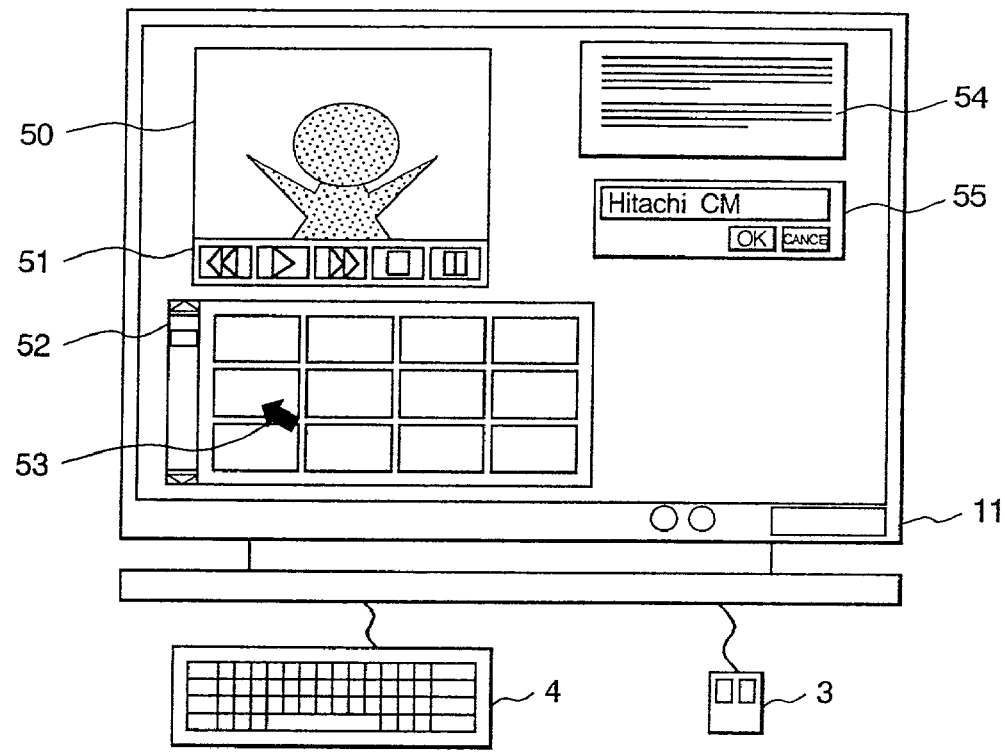
FIG. 16 is a drawing showing a display screen example during image retrieval of self organization of video by the present invention.

FIG. 16 shows an embodiment of a display screen used for interaction with a user. A film image of video is played back and displayed on a monitor window 50 on the display of the computer. As a window displayed on the same screen, there are a window 52 for displaying a list of typical frame images among images, a text window 55 for inputting attributes of images and scenes, and a window 54 for displaying retrieved results in addition to the window 50. Retrieved results may be displayed on the window 52. These windows can be moved to an optional position on the screen by operating a cursor 53 which can be freely moved by the mouse which is one of the pointing device 3. To input text, the keyboard 4 is used. A typical frame displayed on the window 52 is, for example, the top frame of each cut when an image is divided in cut-wise. Buttons 51 are buttons for controlling the playback status of an image and when the buttons are clicked by the mouse, playback, fast feed, or rewinding of images can be controlled. Scenes to be played back can be continuously selected by clicking the typical Frame images displayed as a list on the window 52. In this case, as video to be played back, images outputted by the video reproducing apparatus 5 connected to the computer may be used or digitized images registered in an external information storage may be used. When the video reproducing apparatus 5 is used, the frame number at the top of a scene is sent to the video reproducing apparatus and the playback is started from the scene corresponding to the frame number. When the playback reaches the frame number at the end of the scene, an instruction for suspending the playback is sent to the video reproducing apparatus 5. The same may be basically said with a digitized image, though digital video data is read and then it is converted to drawing data for a computer and displayed as a kind of graphic. When the display process for one frame ends, the display process of the next frame is continuously executed and by doing this, moving picture images are displayed. In accordance with the time required for the display process, the number of frame images to be displayed for a fixed time is adjusted so as to prevent images from rather fast feed or rather slow feed. On the monitor window 50, images from the broadcast receiver 7 can be also displayed.

The operation procedure for video retrieval by a user using the screen shown in FIG. 16 will be described hereunder. Firstly, he specifies an image to be queried. The simplest method is a method for executing fast feed or rewinding using the operation buttons 51 and finding an optional scene by checking images displayed on the monitor window 50. The list of typical frames arranged on the window 52 is equivalent to the contents or indexes of a book and by referring to it, he can find a desired scene more quickly. To specify a scene, there is no need to accurately specify the range of the scene and it is desirable to specify an optional frame included in the scene. In this case, it may be specified by clicking the frame displayed on the monitor window 50 by the mouse. If a frame image included in the image to be queried is displayed in the list of typical frames on the window 52, it may be clicked by the mouse. Next, on the text window 55, the user inputs and registers attribute information such as the selected scene, title of the whole image, and person's name from the keyboard. The repetition time of registration is optional and if there is no need to reuse the attribute information hereafter, there is no need to register the attribute information at all. Finally, the user presents a retrieval scare request. It can be done by clicking the OK button of the text window 55. By doing this, the system starts the retrieval process. The system imaginarily generates a segment with a fixed length having the specified frame just in the middle thereof and applies the segment to the retrieval method of the present invention as an image to be queried. The target image may be newly inputted from the video reproducing apparatus. If it is an image which is already registered as a data base and whose feature table is generated, the comparison process is performed for the feature table. In this case, if the frame specified first is included in the segment of the obtained retrieved result, it is the retrieved result. Furthermore, it is checked whether it is a partial match or a match of the whole segment. In the case of a match of the whole segment, it is possible to spread the segment forward and backward and accurately obtain the matched segment. This is a retrieving method utilizing the advantage of the method of the present invention which can search for a partially matched segment at high speed.

Figure 17:
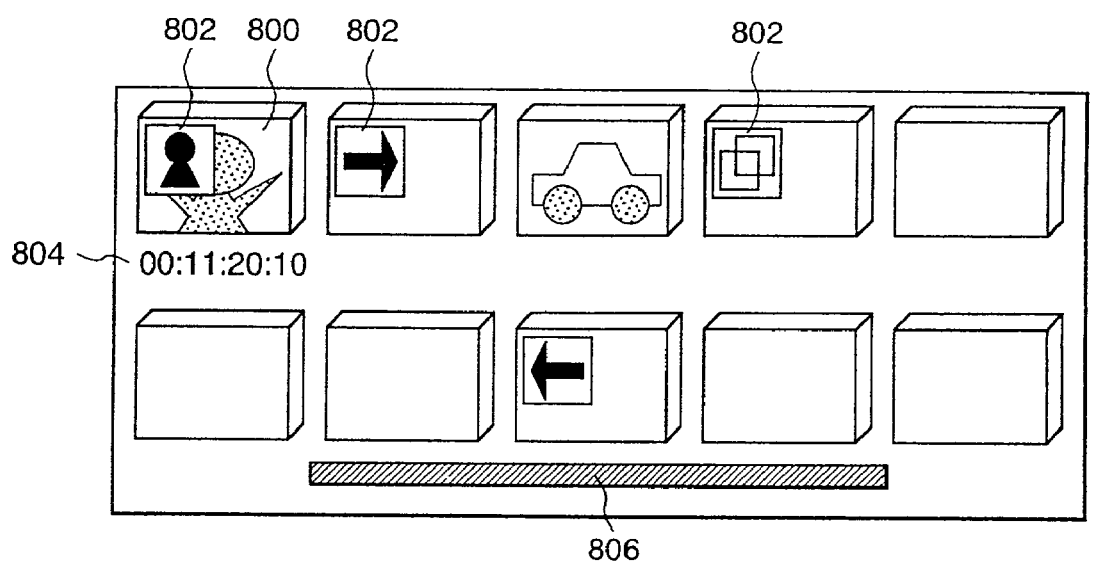
FIG. 17 is a drawing showing a display screen example during image retrieval of self organization of video by the present invention.
Figure 18:
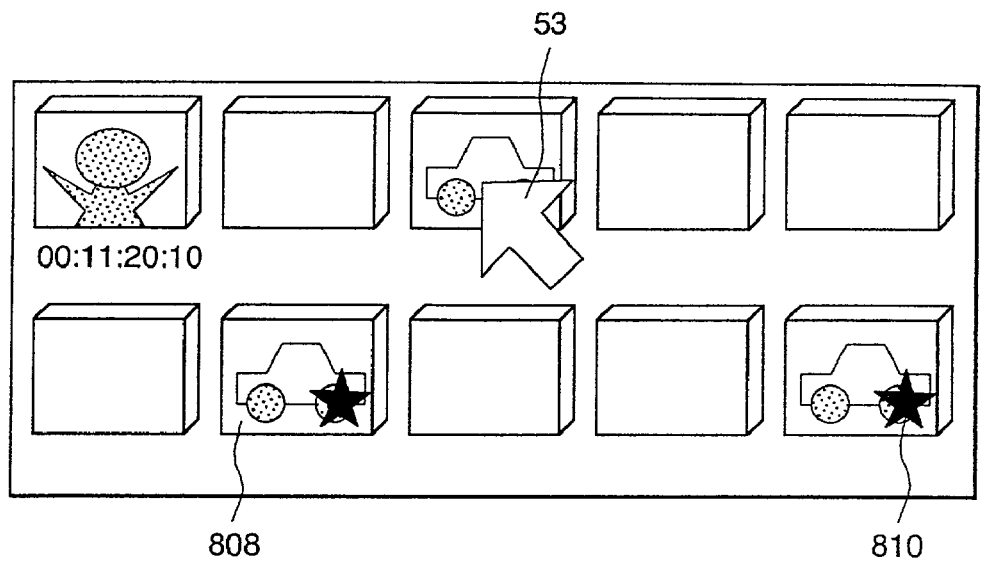
FIG. 18 is a drawing showing a display screen example during image retrieval of self organization of video by the present invention.

Retrieved results are displayed on the window 54. Display contents are attribute information, time information, and others. Or, retrieved results can be graphically displayed in the format shown in FIG. 17. FIG. 17 is an enlarged view of the window 52 and numeral 800 indicates an icon image of each typical frame. When a horizontal bar 806 is put under an icon image, it is found that a retrieved result exists in the scene corresponding to the icon image. When a retrieved result spans a plurality of scenes of an icon image, the bar becomes longer for the part. The bar is classified by a color or a hatching pattern. For a plurality of scenes found by retrieval of the same scene, the same color is displayed. On the other hand, for a retrieved result of a scene and a retrieved result of another scene, different colors are displayed. The list of typical frames can be used as contents or indexes of images as mentioned above and is very useful for finding an image to be queried. However, a dilemma arises that the typical frames are not all images included in video and if all images are tabulated, it is difficult to find a desired image from them. Therefore, it can be considered to extract typical characteristics of scenes indicated by the typical frames by analyzing video and for example, to find video of a part not included in images of the typical frames by displaying each icon image 800 together with information 802 representing characteristics and time information 804. Such information representing scene characteristics includes existence of a person, camera work (zoom, pan, tilt, etc.), existence of special effect (fade in or out, dissolve, wipe, etc.), existence of title, and others. With respect to the image recognition method for detecting images, Japanese Patent Application Laid-Open 7-210409 (applied on Aug. 18, 1995) applied by the inventors of the present invention can be used. The related disclosure of Japanese Patent Application No. 7-210409 is incorporated herein by reference. When the method of the present invention is applied, it can be useful to dissolve the dilemma of the list of typical frames by another approach. With respect to repetitive scenes, not the whole scenes but some of them may be included in the list of typical frames. For example, in FIG. 18, when one of the repetitive scenes is clicked and retrieved by the cursor 53, scenes having the same video part as that of the scene are all found and indicated to the user. The retrieved result is indicated in a form of emphasizing the icon image of the scene including the retrieved segment, for example, like a star mark 810 superimposed on an icon image 808. In this case, if the icon image itself to be displayed is replaced with a frame image in the retrieved segment, the indication is made more clearly understandable. By doing this, if there is only one image of the same scene as the scene to be found in the list of typical frames, it is possible to find a desired scene by the help of it and the serviceableness of the list of typical frames is enhanced. The same method can be applied to the video displayed on the monitor window 50 and it is also possible to specify a frame displayed by clicking, retrieve the same scenes as the scene including the frame, and jump to one of the found scenes. To realize such a process, a troublesome preparation such as setting of a link node is conventionally necessary. However, if the method of the present invention is used, very quick retrieval is available, so that it is desirable to execute retrieval when necessary and no preparation is necessary.

To execute the self organization process shown in the block diagram in FIG. 9, the user does not need to execute any special process for retrieval and if he just inputs an image, the computer automatically executes the process.

In the above explanation, the method for retrieving on the basis of image characteristics of video is described. However, voice characteristics may be used and needless to say, to not only video but also media which can be successively handled, this retrieval method can be applied.

Figure 19:
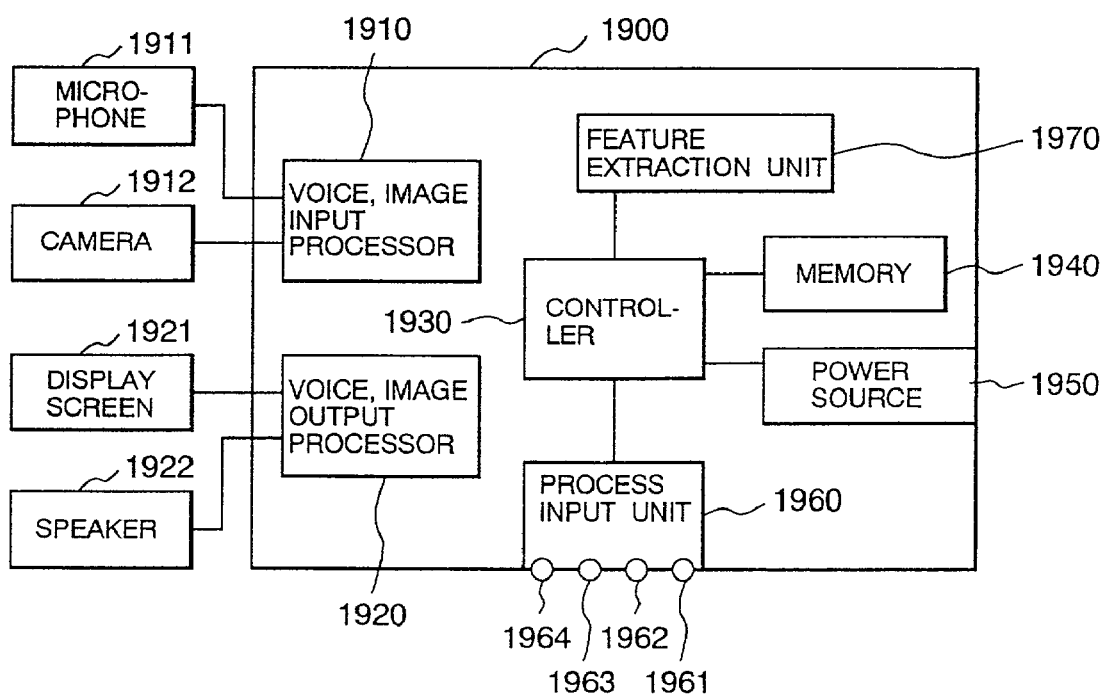
FIG. 19 is a schematic block diagram when the present invention is applied to a video camera.

FIG. 19 shows an example that the image retrieval art of the present invention is applied to a video camera. When power is turned on by a power switch 1961 installed in a process input unit 1960 and picture recording is instructed by a picture recording button 1962, a voice, image input processor 1910 performs processes of inputting a voice signal from a microphone 1911 and an image signal from a camera 1912. The process of the voice, image input processor includes the A-D conversion process and compression process for inputted voice and image signals. A feature extraction unit 1970 extracts frame-wise features from an inputted image signal. The process contents are the same as those of the frame feature extractor 106 shown in FIGS. 2 and 9. The extracted features are stored in a memory 1940 as a feature table. The memory 1940 uses a built-in semiconductor memory and a removable memory card. Inputted voice and image signals are retained in the memory 1940, read from the memory 1940 by a playback instruction from a playback button 1963, and subjected to the expanding process for signal compression and the D-A conversion process by the voice, image output processor, and images are outputted to a display screen 1921, and voice is outputted from a speaker 1922. A controller 1930 manages and controls the whole signal process of the video camera. With respect to an inputted image, the feature thereof is extracted for each frame and stored in the memory. The controller 1930 compares the feature of an inputted image with the features of past frames retained in the memory 1940. The comparison process may be performed in the same way as with the feature comparator 130 shown in FIGS. 2 and 9. As a result of comparison, the segment of scenes having a similar feature is retained in the memory 1940 in the same format as that of the retrieved result table (128 shown in FIGS. 2 and 9). Numeral 1950 indicates a terminal for supplying power for driving the video camera and a battery may be mounted. An image retrieval menu button 1964 instructs a brief editing process such as rearrangement or deletion of scenes or a process of instructing a desired scene and retrieving and playing back similar scenes by pressing the button 1964 several times on the display screen 1921 on which a recorded moving picture image is displayed, for example, like FIGS. 16, 17, and 18. With respect to the art for detecting the changing point of a moving picture image used for sorting of scenes, Japanese Patent Application Laid-Open 7-32027 (applied on Feb. 21, 1995) applied by the inventors of the present invention can be referred to. The related disclosure of Japanese Patent Application No. 7-32027 is incorporated herein by reference. Scenes are retrieved by use of the image feature comparison process executed in FIGS. 2 and 9. For such a video camera, it is necessary to adjust the conditions of the feature comparison process rather loosely. The reason is that unlike a TV program, when a user generally picks up images with a video camera, he scarcely picks up exactly same images. Therefore, when similar scenes or persons in the same style of dress are photographed in a similar size, the comparison condition is set so that they are retrieved as similar scenes. Picked-up images are analyzed at the same time with recording and grouping for each scene and indexing between similar scenes are completed, so that recorded images can be edited immediately after picking up and the usability by a user is improved.

EFFECTS OF THE INVENTION

According to the present invention, by the aforementioned method, redundant segments with an almost same feature continued are collected and compared into a unit. Therefore, there is no need to execute comparison for each frame, and the calculation amount can be greatly reduced, and a form that comparison is falsely executed between the feature series in frame-wise is taken at the same time, so that the method is characterized in that the same image segment can be specified with the frame accuracy. Whenever a frame is inputted, only the frame is compared, so that the processing amount for one frame input is made smaller and the method is suitable for processing of images requiring the real time including broadcast images. A plurality of image parts detected at the same time are exactly same images, so that when they are stored as a set, if a request to search one partial image is presented, the retrieval is completed by indicating another partial image of the set and a very quick response can be expected.

The invention claimed is:

1. A system for describing a video comprising:
   means for extracting a feature from the video in each of a plurality of predetermined periods;
   means for comparing extracted features of each of the periods to obtain a representative feature representing successive ones of the periods in which the extracted features are within an allowable range; and means for recording the representative feature with length information indicating the periods that are represented by the representative feature.

2. A system for describing a video according to claim 1, wherein the means for extracting extracts color as the extracted feature.

3. A system for describing a video according to claim 1, wherein the means for extracting extracts a shape of a boundary line as the extracted feature.

4. A system for describing a video according to claim 1, wherein the means for extracting extracts texture as the extracted feature.

5. A system for describing a video according to claim 1, wherein the means for extracting extracts the feature from at least one frame of the video in each of the predetermined periods.

6. A system for describing a video according to claim 1, wherein the means for extracting extracts the feature from each frame of the video as the predetermined period, and the means for recording the representative feature with length information records the length information as a frame number.

7. A system for describing a video comprising:

means for extracting features from the video within specified intervals;

means for setting a first feature as a representative feature and an interval of the first feature as a first segment;

means for comparing a current one of the extracted features with the representative feature;

means for adding the interval of the current extracted feature to the first segment when a difference is within a threshold;

means for setting the current extracted feature as another representative feature and the interval of the current extracted feature as another segment when the difference is larger than the threshold; and means for recording each representative feature with length information indicating the segment represented by the representative feature.

8. A system for describing a video according to claim 7, wherein the means for extracting extracts color as the extracted feature.

9. A system for describing a video according to claim 7, wherein the means for extracting extracts the feature from at least one frame of the video in each of the predetermined periods.

10. A system for describing a video according to claim 7, wherein the means for extracting extracts the feature from each frame of the video as the predetermined period, and the means for recording the representative feature with length information records the length information as a frame number.

* * * * *